United States Patent
Wang

(10) Patent No.: US 11,622,061 B2
(45) Date of Patent: Apr. 4, 2023

(54) IMAGE OUTPUT DEVICE, IMAGE RECEIVING DEVICE, AND IMAGE TRANSMISSION METHOD

(71) Applicant: Aten International Co., Ltd., New Taipei (TW)

(72) Inventor: Hsi-Pang Wang, New Taipei (TW)

(73) Assignee: Aten International Co., Ltd., New Taipei (TW)

( * ) Notice: Subject to any disclaimer, the term of this patent is extended or adjusted under 35 U.S.C. 154(b) by 0 days.

(21) Appl. No.: 17/472,587

(22) Filed: Sep. 11, 2021

(65) Prior Publication Data

US 2022/0201159 A1     Jun. 23, 2022

(30) Foreign Application Priority Data

Dec. 22, 2020   (TW) .................. 109145582

(51) Int. Cl.
*H04N 1/60* (2006.01)
*H04N 5/272* (2006.01)

(52) U.S. Cl.
CPC ........... *H04N 1/6008* (2013.01); *H04N 5/272* (2013.01)

(58) Field of Classification Search
CPC ............... H04N 1/6008; H04N 5/272
USPC ......................................... 358/518, 1.9, 1.15
See application file for complete search history.

(56) References Cited

U.S. PATENT DOCUMENTS

| | | | |
|---|---|---|---|
| 8,922,578 B2 | 12/2014 | Hunleth | |
| 9,955,173 B2 | 4/2018 | Dev et al. | |
| 2015/0195544 A1* | 7/2015 | Dev ...................... | H04N 19/182 375/240.26 |
| 2017/0280022 A1* | 9/2017 | Kuroiwa ............ | H04N 1/00068 |
| 2020/0027201 A1 | 1/2020 | Chen | |

FOREIGN PATENT DOCUMENTS

| | | |
|---|---|---|
| CN | 107529050 | 12/2017 |
| CN | 108573490 | 9/2018 |
| CN | 111899176 | 11/2020 |
| TW | 200739453 | 10/2007 |
| TW | I482122 | 4/2015 |
| TW | 201921943 | 6/2019 |

\* cited by examiner

*Primary Examiner* — Quang N Vo
(74) *Attorney, Agent, or Firm* — JCIPRNET

(57) ABSTRACT

An image output device, an image receiving device, and an image transmission method are provided. The image transmission method includes the following. A source image is transformed into an augmented image by an image output device. The source image includes M source pixels and the augmented image includes N augmented pixels. The augmented image is received by an image receiving device. The augmented image is transformed into the source image. M is less than N.

17 Claims, 3 Drawing Sheets

IMAGE OUTPUT DEVICE, IMAGE RECEIVING DEVICE, AND IMAGE TRANSMISSION METHOD

CROSS-REFERENCE TO RELATED APPLICATION

This application claims the priority benefit of Taiwanese application no. 109145582, filed on Dec. 22, 2020. The entirety of the above-mentioned patent application is hereby incorporated by reference herein and made a part of this specification.

BACKGROUND

Technical Field

The disclosure relates to an image output device, an image receiving device, and an image transmission method.

Description of Related Art

In order to increase image richness, TV stations or audio-visual creators would position performers in front of a green screen in a virtual studio, and then remove and replace the green screen with information to be added, such as backgrounds, images, and subtitles, through an image processing system, to be thereby mixed into a virtual background to produce an output image. When removing the green screen, the image processing system determines whether it is green with an algorithm, and further encodes corresponding auxiliary information to transparentize the green screen, so that the background of the performer is replaced with the virtual background.

In this process, the image with the auxiliary information is encoded into an image stream, and a corresponding receiver decodes the image stream and generates the output image. In existing encoding methods, issues such as loss of picture details or color limitation are present due to compression.

SUMMARY

This disclosure provides an image output device, an image receiving device, and an image transmission method.

This disclosure proposes an image output device, including a processing unit and an image output port. The processing unit converts a source image into an augmented image. The source image includes M source pixels. The augmented image includes N augmented pixels. The image output port is coupled to the processing unit and outputs the augmented image. M is less than N.

This disclosure proposes an image receiving device, including an image input port and a processing unit. The image input port receives an augmented image. The augmented image includes N augmented pixels. The processing unit is coupled to the image input port and converts the augmented image into a source image. The source image includes M source pixels. M is less than N.

This disclosure proposes an image transmission method, including the following. A source image is transformed into an augmented image by an image output device. The source image includes M source pixels and the augmented image includes N augmented pixels. The augmented image is received by an image receiving device. The augmented image is transformed into the source image. M is less than N.

DESCRIPTION OF THE EMBODIMENTS

Figure 1:
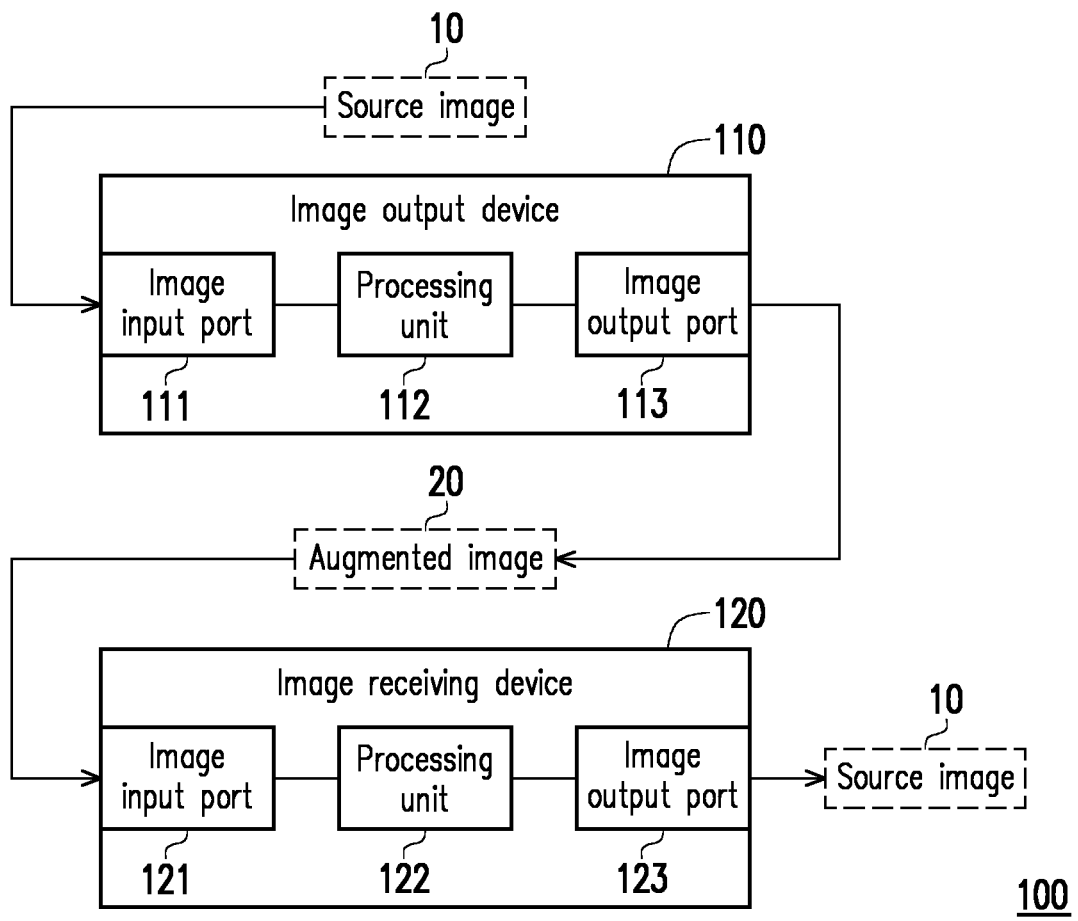
FIG. 1 is a block diagram of an image transmission system according to an embodiment of the disclosure.
Figure 2:
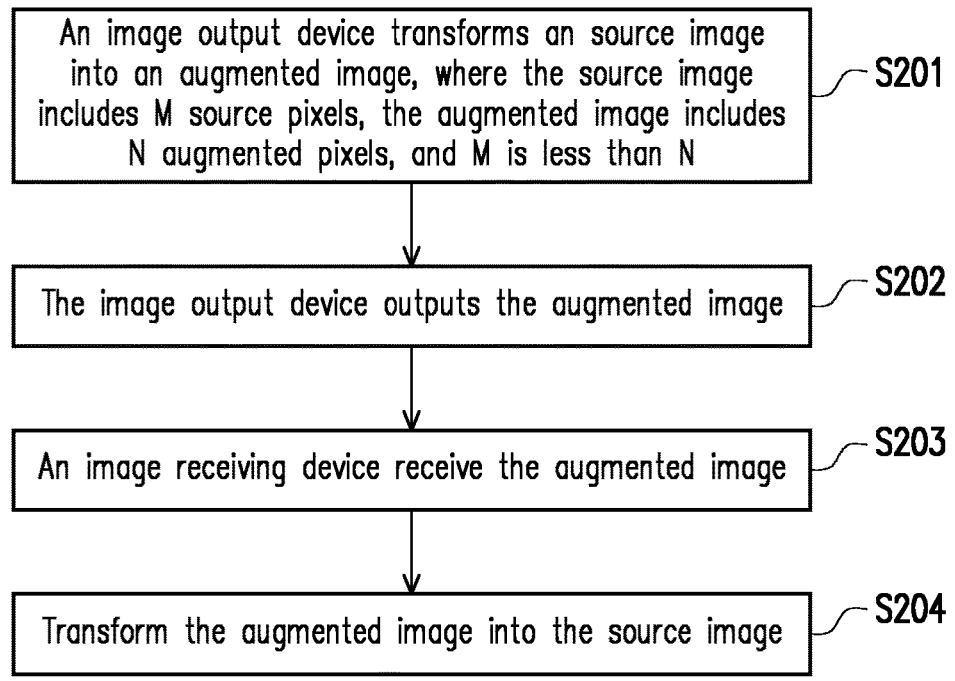
FIG. 2 is a flowchart of an image transmission method according to an embodiment according to the disclosure.

With reference to FIG. 1 and FIG. 2, according to an embodiment of the disclosure, an image transmission system 100 includes an image output device 110 and an image receiving device 120. The image receiving device 120 is coupled to the image output device 110. The image output device 110 includes an image input port 111, a processing unit 112, and an image output port 113. The processing unit 112 is coupled between the image input port 111 and the image output port 113. The image receiving device 120 includes an image input port 121, a processing unit 122, and an image output port 123. The processing unit 122 is coupled between the image input port 121 and the image output port 123. The image output port 113 is coupled to the image input port 121.

In other embodiments, the image output device 110 may not include the image input port 111, and/or the image receiving device 120 may not include the image output port 123.

The image input port 111, the image output port 113, the image input port 121, and the image output port 123 may each be a high definition multimedia interface (HDMI), a display port (DP), a digital visual interface (DVI), a video graphics array (VGA), a serial peripheral interface (SPI), or other similar transmission interfaces. The disclosure is not limited thereto.

The processing unit 112 and the processing unit 122 may each be a central processing unit (CPU), or any other programmable general-purpose or special-purpose microprocessor, digital signal processor (DSP), programmable controller, application-specific integrated circuit (ASIC), or other similar elements or a combination of the above elements. The disclosure is not limited thereto.

In an embodiment, the processing unit 112 of the image output device 110 converts a source image 10 into an augmented image 20. The source image 10 includes M source pixels, the augmented image 20 includes N augmented pixels, and M is less than N (as shown in step S201). Each of the source pixels includes auxiliary information, and some of the augmented pixels do not include the auxiliary information. Then, the image output port 113 of the image output device 110 outputs the augmented image 20 (as shown in step S202). Specifically, each of the source pixels of the source image 10 includes a plurality of image data, and one of the plurality of image data in each of the source pixels includes the auxiliary information.

In an embodiment, the auxiliary information may include at least one of transparency information, image data information, and the like. The image data information may be additional image information (e.g., layer information, camera parameters, or other image-related information), user input information (e.g., touch operation, cursor operation, and other control information of an electronic device), or other related information. For example, the layer information may be applied to transmission of interactive contents, allowing a viewer to determine the content to be displayed through the electronic device at a receiving end, increasing a sense of interaction of the viewer. The camera parameters may also be transmitted to the electronic device at the receiving end for the electronic device to perform image splicing, three-dimensional image production, and other image synthesis applications. Optical properties such as spherical aberration, aperture, and shutter may be calibrated, so that the image first achieves expected consistency, and then subsequent synthesis operations are performed, thereby preventing the electronic device from the operation of first determining image deviation. The user input information (e.g., touch operation or cursor operation) may be transmitted to the electronic device is an application in a scenario where multi-devices work together, or an upstream machine controls a downstream machine.

In an embodiment, the image data of each of the source pixels not only includes the auxiliary information, but the rest image data may also be any combination of red pixel information, green pixel information, blue pixel information, yellow pixel information, white pixel information, black pixel information, or other relevant image pixel information. Each of the augmented pixels includes a plurality of image data, and the image data may be any combination of red pixel information, green pixel information, blue pixel information, yellow pixel information, white pixel information, black pixel information, auxiliary information, or other related image pixel information. The disclosure is not limited thereto.

The source image 10 may be stored by the image output device 110 or generated by the processing unit 112 of the image output device 110. The source image 10 may as well be received by the image output device 110 through the image input port 111 from an outside of the image output device 110. It is not limited by the disclosure how the processing unit 112 of the image output device 110 obtains the source image 10.

After the augmented image 20 is output by the image output device 110, the augmented image 20 is received by the image input port 121 of the image receiving device 120 (as shown in step S203), and the augmented image 20 is converted into the source image 10 (as shown in step S204) through the processing unit 122.

Figure 3:
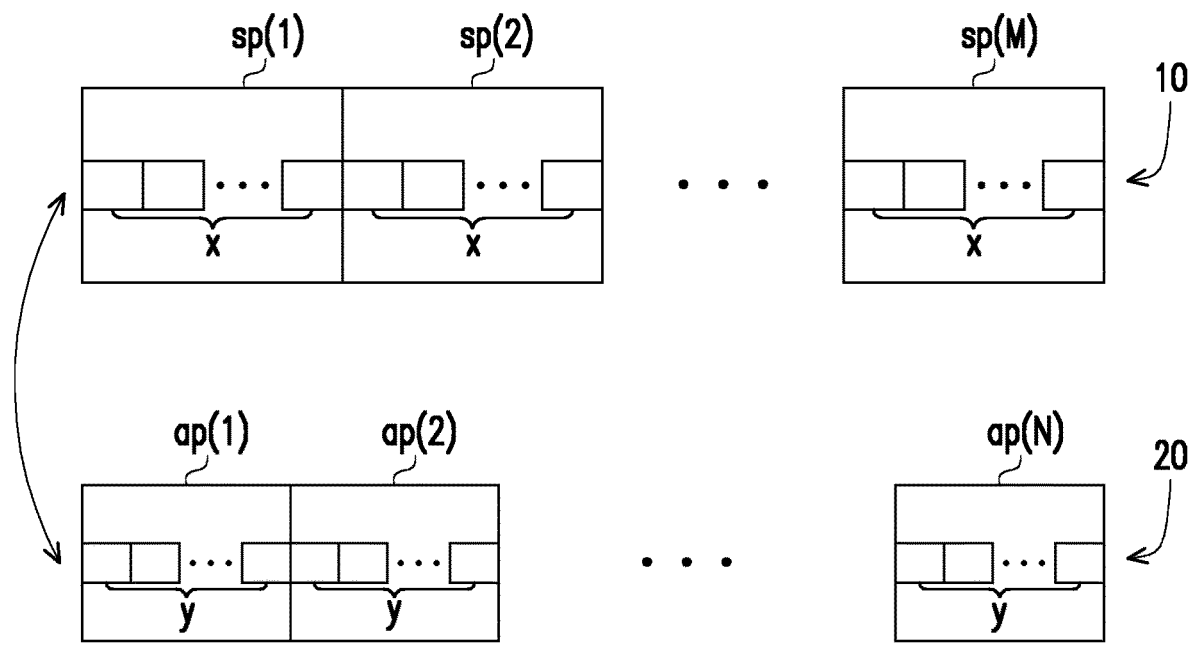
FIG. 3 is a schematic diagram of conversion between a source image and an augmented image according to an embodiment of the disclosure.

With reference to FIG. 1 and FIG. 3, the processing unit 112 of the image output device 110 converts M source pixels sp(1) to sp(M) sequentially arranged in the source image 10 into N augmented pixels ap(1) to ap(N) in the augmented image 20. Each of the source pixels sp(1) to sp(M) includes x image data, and each of the augmented pixels ap(1) to ap(N) includes y image data. A formula that $M*x=N*y$, where M is less than N is obtained, namely that a total of image data in the source image 10 is equal to a total of image data in the augmented image 20. Similarly, the processing unit 122 of the image receiving device 120 may convert the N augmented pixels ap(1) to ap(N) sequentially arranged in the augmented image 20 into the M source pixels sp(1) to sp(M) in the source image 10. The x image data of each of the source pixels sp(1) to sp(M) include the auxiliary information, and the y image data of some of the augmented pixels ap(1) to ap(N) do not include the auxiliary information.

For example, the processing unit 112 of the image output device 110 may convert 3 source pixels sp(1) to sp(3) sequentially arranged in the source image 10 into 4 augmented pixels ap(1) to ap(4). Each of the source pixels sp(1) to sp(3) includes 4 image data and each of the augmented pixels ap(1) to ap(4) includes 3 image data. That is, when M=3 and N=4, x=4 and y=3, so $M*x=N*y$. In other words, the source image 10 received by the processing unit 112 includes the sequentially arranged 3 source pixels sp(1) to sp(3), and each of the source pixels sp(1) to sp(3) includes 4 image data. The processing unit 112 re-combines the 12 image data sequentially arranged in the source image 10 with 3 image data as a set, thereby converting them into the 4 augmented pixels ap(1) to ap(4). Each of the augmented pixels ap(1) to ap(4) includes 3 image data, and some of the augmented pixels do not include the auxiliary information.

Similarly, the processing unit 122 of the image receiving device 120 may convert the sequentially arranged 4 augmented pixels ap(1) to ap(4) into the 3 source pixels sp(1) to sp(3). The 4 image data of each of the source pixels sp(1) to sp(3) include the auxiliary information, and based on such conversion, the 3 image data of some of the augmented pixels ap(1) to ap(4) may not include the auxiliary information.

Figure 4:
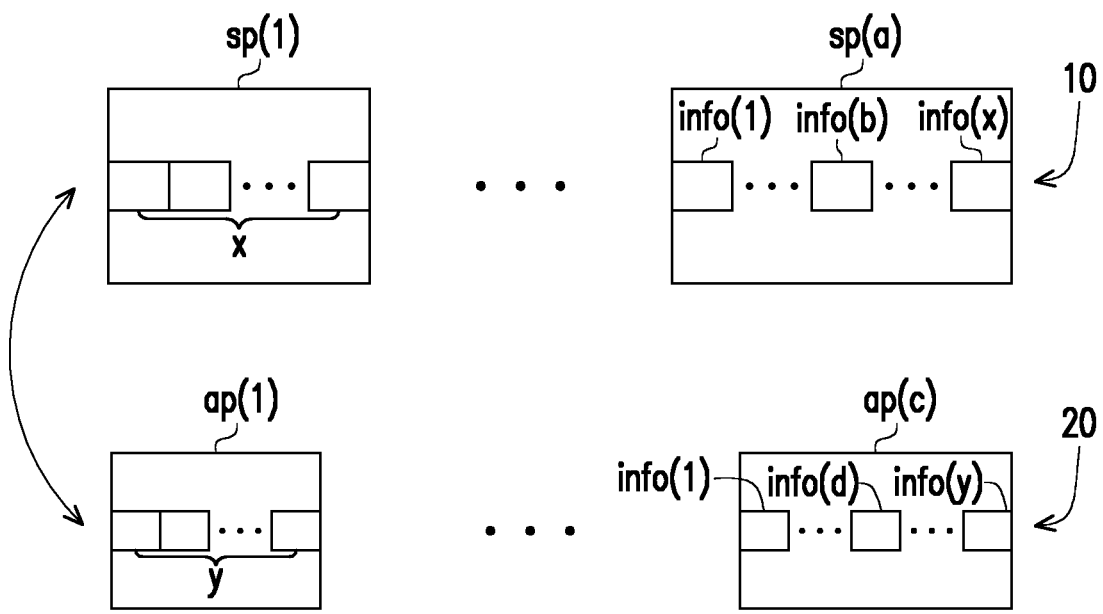
FIG. 4 is a schematic diagram of conversion between a source image and an augmented image according to another embodiment of the disclosure.

With reference to FIG. 1 and FIG. 4, when the processing unit 112 of the image output device 110 converts the source image 10 into the augmented image 20, a $b^{th}$ image data info(b) in an $a^{th}$ source pixels sp(a) in the source image 10 corresponds to a $d^{th}$ image data info(d) in a $c^{th}$ augmented pixels ap(c) of the augmented image 20, where $(a-1)*x+b=(c-1)*y+d$. Similarly, when the processing unit 122 of the image receiving device 120 converts the augmented image 20 into the source image 10, the $d^{th}$ image data info(d) in the $c^{th}$ augmented pixels ap(c) in the augmented image 20 corresponds to the $b^{th}$ image data info(b) in the $a^{th}$ source pixel sp(a) in the source image 10, where $(c-1)*y+d=(a-1)*x+b$. That is, each image data of each pixel in the source image 10 is in a one-to-one correspondence with each image data of each pixel in the augmented image 20.

For example, the processing unit 112 of the image output device 110 converts 3 source pixels of the source image 10 into 4 augmented pixels of the augmented image 20. Each of the source pixels includes 4 image data, and each of the augmented pixels includes 3 image data. The $2^{nd}$ image data info(2) in the $3^{rd}$ source pixel sp(3) in the source image 10 corresponds to the $1^{st}$ image data info(1) in the $4^{th}$ augmented pixel ap(4) in the augmented image 20. In this example, a=3, b=2, c=4, d=1, x=4, y=3 and $(3-1)*4+2=(4-1)*3+1$.

Figure 5:
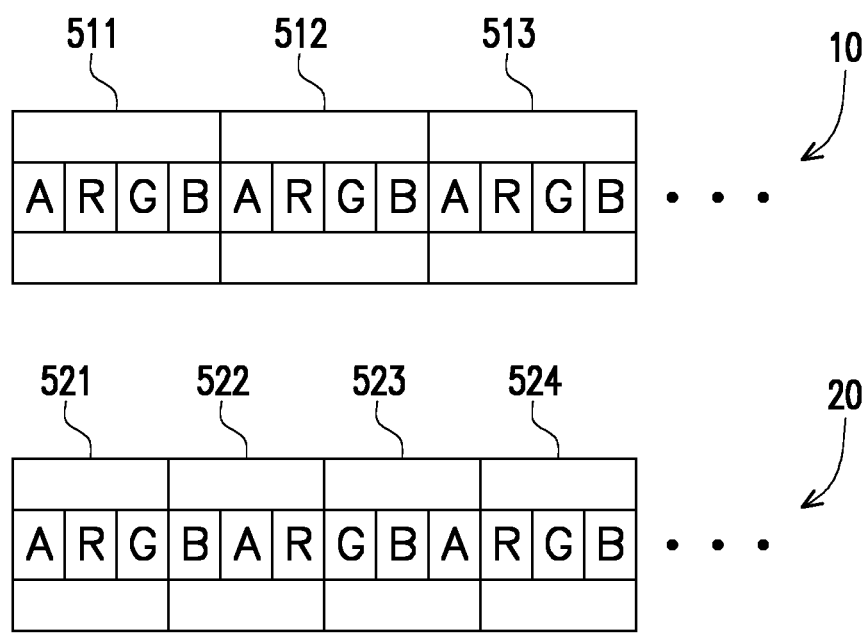
FIG. 5 is a schematic diagram of source pixels and augmented pixels according to an embodiment of the disclosure.

With reference to FIG. 1 and FIG. 5, when the source image 10 is converted into the augmented image 20, or when the augmented image 20 is converted into the source image 10, source pixels 511 to 513 each include auxiliary information A, red pixel information R, green pixel information G, and blue pixel information B. Adjacent two of augmented pixels 521 to 524 respectively include some of the auxiliary information A, the red pixel information R, the green pixel information G, and the blue pixel information B, and combinations of image data between adjacent two of the augmented pixels 521 to 524 are different from each other. For example, the augmented pixel 521 includes "the auxiliary information A, the red pixel information R, and the green pixel information G", and the augmented pixel 522 includes "the blue pixel information B, the auxiliary information A, and the red pixel information R". That is, the combinations of image data of the adjacent two augmented pixels 521 and 522 are different from each other, and the augmented pixel 521 and the augmented pixel 522 include only some of the auxiliary information A, the red pixel information R, the green pixel information G, and the blue pixel information B.

For example, through converting every three source pixels of the source image 10 into four augmented pixels of the augmented image 20, the processing unit 112 of the image output device 110 may convert the source image 10 with a resolution of 1920×1080 into the augmented image 20 with a resolution of 2560×1080, and the processing unit 122 of the image receiving device 120 may convert the augmented image 20 with the resolution of 2560×1080 back into the source image 10 with the resolution of 1920×1080. Accordingly, a larger bandwidth may be adopted in the conversion process to retain all the detailed information of the source image 10 without loss of the image data.

What is claimed is:

1. An image output device, comprising:
a processing circuit converting a source image into an augmented image, wherein the source image comprises M source pixels and the augmented image comprises N augmented pixels; and
an image output port coupled to the processing circuit and outputting the augmented image,
wherein M is less than N,
wherein the processing circuit converts the M source pixels sequentially arranged into the N augmented pixels, each of the source pixels comprises x image data, and each of the augmented pixels comprises y image data, wherein M*x=N*y.

2. The image output device as described in claim 1, wherein each of the source pixels comprises x image data, each of the augmented pixels comprises y image data, and a $b^{th}$ image data in an $a^{th}$ source pixel in the source image corresponds to a $d^{th}$ image data in a $c^{th}$ augmented pixel in the augmented image, wherein $(a-1)*x+b=(c-1)*y+d$.

3. The image output device as described in claim 1, wherein each of the source pixels comprises a plurality of image data, adjacent two of the augmented pixels respectively comprise some of the image data, and arrangements and combinations of the image data between the adjacent two of the augmented pixels are different from each other.

4. The image output device as described in claim 1, wherein each of the source pixels comprises auxiliary information, and some of the augmented pixels do not comprise the auxiliary information.

5. The image output device as described in claim 4, wherein each of the source pixels comprises a plurality of image data, the image data comprise the auxiliary information, red pixel information, green pixel information, and blue pixel information, and each of the augmented pixels comprises three of the auxiliary information, the red pixel information, the green pixel information, and the blue pixel information.

6. The image output device as described in claim 1, further comprising an image input port coupled to the processing circuit and receiving the source image.

7. An image receiving device, comprising:
an image input port receiving an augmented image, wherein the augmented image comprises N augmented pixels; and
a processing circuit coupled to the image input port and converting the augmented image into a source image, wherein the source image comprises M source pixels, wherein M is less than N,
wherein the processing circuit converts the N augmented pixels sequentially arranged in the augmented image into the M source pixels, each of the augmented pixels comprises y image data, and each source pixel comprises x image data, wherein N*y=M*x.

8. The image receiving device as described in claim 7, wherein each of the source pixels comprises x image data, each of the augmented pixels comprises y image data, and a $b^{th}$ image data in an $a^{th}$ source pixel in the source image corresponds to a $d^{th}$ image data in a $c^{th}$ augmented pixel in the augmented image, wherein $(a-1)*x+b=(c-1)*y+d$.

9. The image receiving device as described in claim 7, wherein each of the source pixels comprises a plurality of image data, adjacent two of the augmented pixels respectively comprise some of the image data, and arrangements and combinations of the image data between the adjacent two of the augmented pixels are different from each other.

10. The image receiving device as described in claim 7, wherein each of the source pixels comprises auxiliary information, and some of the augmented pixels do not comprise the auxiliary information.

11. The image receiving device as described in claim 10, wherein each of the source pixels comprises a plurality of image data, the image data comprise the auxiliary information, red pixel information, green pixel information, and blue pixel information, and each of the augmented pixels comprises three of the auxiliary information, the red pixel information, the green pixel information, and the blue pixel information.

12. The image receiving device as described in claim 7, further comprising an image output port coupled to the processing circuit, wherein the image output port receives and outputs the source image.

13. An image transmission method, comprising:
converting a source image into an augmented image by a first processing circuit of an image output device, wherein the source image comprises M source pixels and the augmented image comprises N augmented pixels;
receiving the augmented image by an image receiving device; and
converting the augmented image by a second processing circuit of the image receiving device into the source image,
wherein M is less than N,
wherein the step of converting the source image into the augmented image comprises:
converting the M source pixels sequentially arranged in the source image into the N augmented pixels, wherein each of the source pixels comprises x image data, and each of the augmented pixels comprises y image data, wherein M*x=N*y.

14. The image transmission method as described in claim 13, wherein each of the source pixels comprises x image data, each of the augmented pixels comprises y image data, and a $b^{th}$ image data in an $a^{th}$ source pixel in the source image corresponds to a $d^{th}$ image data in a $c^{th}$ augmented pixel in the augmented image, wherein $(a-1)*x+b=(c-1)*y+d$.

15. The image transmission method as described in claim 13, wherein each of the source pixels comprises a plurality of image data, adjacent two of the augmented pixels respectively comprise some of the image data, and arrangements and combinations of the image data between the adjacent two of the augmented pixels are different from each other.

16. The image transmission method as described in claim 13, wherein each of the source pixels comprises auxiliary information, and some of the augmented pixels do not comprise the auxiliary information.

17. The image transmission method as described in claim 16, wherein each of the source pixels comprises a plurality of image data, the image data comprise the auxiliary information, red pixel information, green pixel information, and blue pixel information, and each of the augmented pixels comprises three of the auxiliary information, the red pixel information, the green pixel information, and the blue pixel information.

* * * * *